United States Patent [19]

McNally et al.

[11] Patent Number: 4,879,716
[45] Date of Patent: Nov. 7, 1989

[54] RESILIENT DATA COMMUNICATIONS SYSTEM

[75] Inventors: Lance McNally, Townsend; Anthony J. Booth, Boxboro; Peter S. Morley, Pepperell, all of Mass.

[73] Assignee: BULL HN Information Systems Inc., Billerica, Mass.

[21] Appl. No.: 137,315

[22] Filed: Dec. 23, 1987

[51] Int. Cl.[4] ............................................. G06F 11/16
[52] U.S. Cl. ..................................... 371/8.2; 371/9.1; 364/200
[58] Field of Search .......................... 371/8, 9, 22, 25; 364/200, 900

[56] References Cited

U.S. PATENT DOCUMENTS

| | | | |
|---|---|---|---|
| 4,542,507 | 9/1985 | Read | 371/8 |
| 4,607,365 | 8/1986 | Greig | 371/9 |
| 4,700,348 | 10/1987 | Ise | 371/8 |
| 4,775,976 | 10/1988 | Yokoyama | 371/9 |
| 4,797,884 | 1/1989 | Yalowitz | 371/9 |

Primary Examiner—Michael R. Fleming
Attorney, Agent, or Firm—Gerald J. Cechony; Lewis P. Elbinger; John S. Solakian

[57] ABSTRACT

A communication data system is designed for resiliency by automatically replacing or bypassing defective units. The system includes a number of input/output terminals which are connected to MODEMs through a relay bank. The MODEMs send serial data to a serial I/O module which converts the serial data to bytes which it places on a VMEbus. A network processor sends the data from the VMEbus to a general purpose computer which places the data into the communications network. A general purpose computer or a back-up general purpose computer may detect a defective communication link and automatically switch to a back-up network computer, or cause a control module to switch the relay module to a spare MODEM and spare SIO. The control module may also generate a remote line test to the link between the MODEM and the terminal to determine if that link is defective.

4 Claims, 11 Drawing Sheets

EFTPOS 1

COMPUTER 6A TEST OF COMMUNICATION LINE, TERMINAL, MODEM AND SIO

COMPUTER 6A TEST OF COMMUNICATION
LINE, TERMINAL, MODEM AND SIO

CSU 2a TEST OF COMPUTER 6a

COMPUTER 6a TEST OF NETWORK
PROCESSORS IN CSU 2a

RESILIENT DATA COMMUNICATIONS SYSTEM

BACKGROUND OF THE INVENTION

1. Field of the Invention

The apparatus of the present invention relates to data processing communication systems, and more particularly to the automatic switching of defective modules to operative modules when a defective communication path is sensed.

2. Description of the Prior Art

Communication systems may include a network of input/output terminals which communicate via leased or circuit switched communication lines. Topologies of terminals is point-to-point, multipoint or clusters controllers exist. The communication lines may be terminated by MODEMs. Information from a terminal may be transmitted into a communication network and information to the terminal may be received by the terminal from the communication network by a MODEM.

A site, such as a Department store, may have many terminals connected to the communication network by a number of MODEMs. These MODEMs may be installed at a central site for ease of connection to the communication site and for ease of maintenance. An installation is usually organized such that a bank of MODEMs may handle a group of terminals.

In the event that a MODEM at the CSU is defective, arrangements are usually available to switch the terminal or group of terminals to another MODEM. This switching of MODEMs was normally accomplished by operator or maintenance personnel manually patching lines into spare MODEMs.

Many terminals at a site requiring many MODEMs, particularly if MODEMs having different functionality are required, are normally located in a single area. Those MODEMs are typically rack mounted requiring a large number of cables, making MODEM replacement difficult and prone to error.

These prior art systems had usually operated as dual systems. When one system was inoperative there was either manual switching to a back-up system, or there was a simplified automatic system for switching systems. That is, a test signal sent into one system would cause automatic switching to the back-up system if the test signal were not received by a terminating unit.

OBJECTS OF THE INVENTION

Accordingly it is an object of the invention to have an improved communication system which has non-manual switchable elements to continue to operate.

SUMMARY OF THE INVENTION

A data communications system includes a number of input/output terminals which send and receive messages over a communications network through Network Access Controllers (NAC). Each NAC includes a Communications Server Unit (CSU) and a general purpose computer.

The system is designed as a resilient system; that is, the system is constructed such that in the event of failure in any single active module, that module can be replaced automatically by redundant modules or components and the network reconfigured to switch out failed units. Therefore the general purpose computer associated with one NAC may, in addition, be the back-up computer for another NAC.

The CSU is also designed for resiliency. Each CSU includes a pair of network processors. A control module having two microprocessors, one connected to each network processor, is in turn connected to designated relay modules. When the general purpose computer determines that a communication link is defective, it signals the control module through the network processor to switch the phone line in the defective communication link to a spare MODEM. A terminal in the defective link will then be operative with the spare module.

The control module may also switch the remote line test capability to verify that the link between the relay module and the terminal is operative.

The normal communication path between the terminal(s) with its associated MODEM(s) and the communication network is over communication lines through a relay module to a MODEM. The serial data output from the MODEM is received by a Serial Input/Output (SIO) module which generates parallel output bytes which are placed on a VMEbus. The network processors read the data bytes and send them out over an RS232 communication line to the general purpose computer and into the communication network.

Data from the communication network is received by the general purpose computer and passes in turn through the network processor, the SIO, the MODEM, the relay network, to the MODEM(s) attached to the terminal(s).

The spare MODEMS are connected to spare SIO's Therefore, if the control module signals received by the relay module, switched the defective communication link to the spare MODEM, then a spare SIO would also replace the SIO in the defective communication link. In the event of SIO module failure all of its terminal connections (i.e. MODEMS) are switched to the spare SIO module with its associated MODEMS.

Also for ease of maintenance and replacement of defective units, all elements are connected to a printed circuit backplane by commercially available connectors.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

Figure 1:
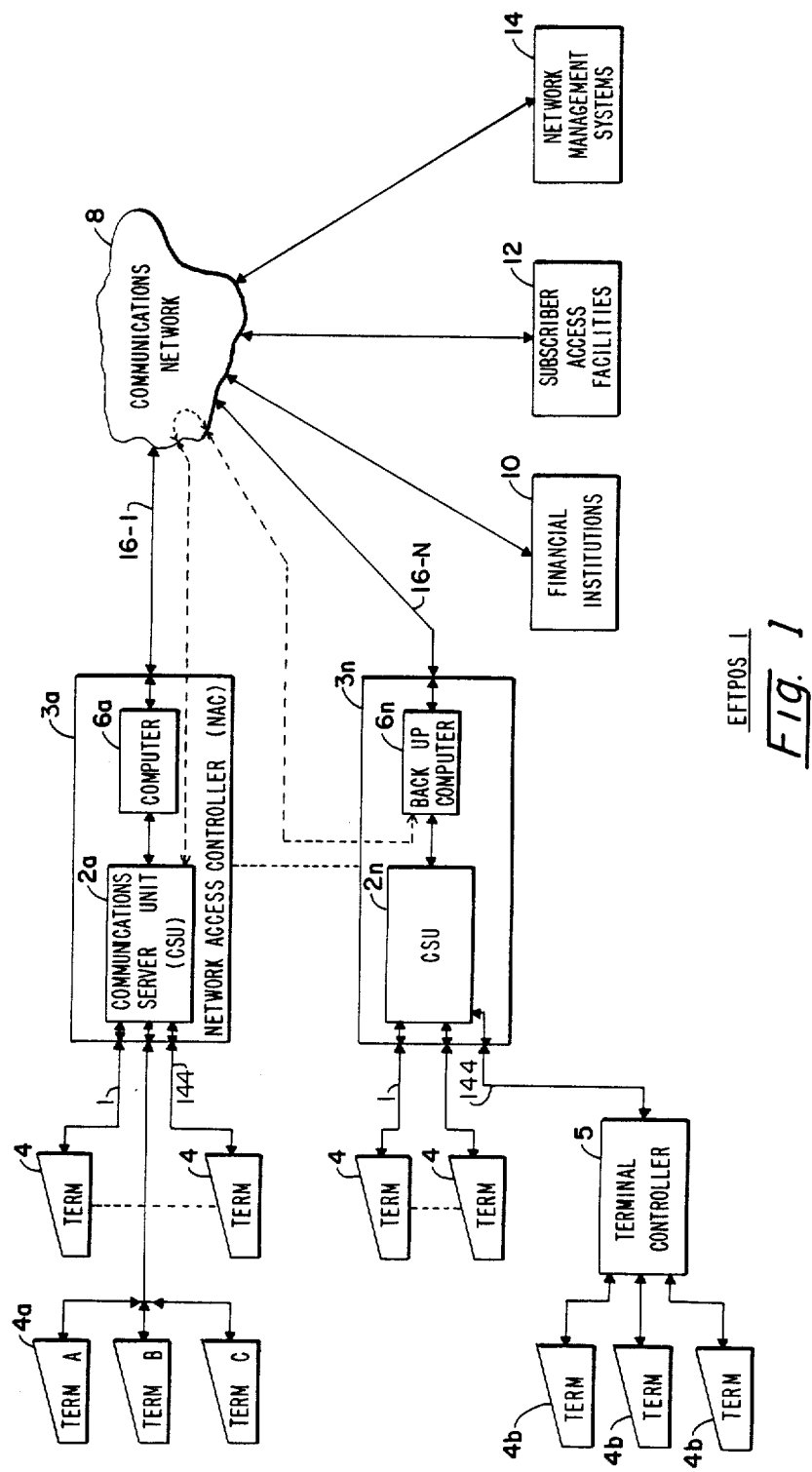
FIG. 1 shows a block diagram of the overall system.

FIG. 1 is an overall block diagram of an Electronic Funds Transfer Point of Service (EFTPOS) System 1 which includes a communication network 8 and a number of Network Access Controllers (NAC) 3a to 3n, each coupled to communications network 8 by communication lines 16-1 through 16-n respectively. Each NAC 3a through 3n includes a communication server unit (CSU) 2a through 2n and a general purpose computer 6a through 6n respectively. Each CSU 2a communicates with a number of Point of Service (POS) terminals 4 in point-to-point or multidrop topologies, typically over a a maximum of 144 lines. General purpose computer 6n is shown in FIG. 1 as a back-up computer 6n to computer 6a. Terminals 4 may share a single communication line as terminals 4a or bid for a terminal controller 5 as terminals 4b.

Also coupled to communication network 8 are a number of Financial Institution Computer Systems 10, a number of subscriber access facilities 12 and network management computer systems 14.

The POS terminal 4 is typically installed at a merchant's place of business which accepts payment for goods and services based on plastic debit cards. The debit cards are typically issued to consumers by the Financial Institutions 10.

A typical operation is for the consumer to present a debit card for payment of goods or services. The salesperson on the merchant's premises will insert the debit card into the POS terminal 4. A message is presented to the NAC 3a which includes the identity of the originating POS terminal 4, information derived from the debit card which identifies the issuing Financial Institution and the amount of the purchase. The message is acquired typically in a polled environment. The NAC 3a presents this information to communications network 8. The Financial Institution 10 on recognizing its identity code or address accepts the information, records the transaction and sends an acceptance or a rejection of the transaction back through the communication network 8, the NAC 3, to the originating terminal 4.

The NAC's 3a through 3n are the network nodes, geographically dispersed to provide local connections to the terminals 4 in the merchant's premises. The NAC's 3a through 3n are predominantly located in telephone exchanges but a small proportion may be located on the customer's premises, particularly when the premises are in shopping malls.

The NAC 3a consists of two major functional units, the computer 6a and the CSU 2a. The computer 6a is responsible for the overall control of the NAC 3a, namely for relaying the information between the terminals 4 and the Financial Institution 10 and for providing configuration and control information, such as detecting and reporting defective communication links.

The CSU 2a is constructed such that all critical components are duplicated. In the event of an internal failure, redundant components are activated to insure the continuation of service pending correction of the problem. However the CSU 2a is dependent on the control services of computer 6a which initiates the corrective actions.

In the event of a failure in computer 6a or its connections to communications network 8, the CSU 2a may establish a connection to a remote computer 6n. The remote computer 6n may be part of another NAC 3n and be controlling its own local CSU 2n. Although a NAC 3a is normally comprised of a computer 6a and a CSU 2a, it will under failure conditions be made up of a local CSU 2a, a remote CSU 2n and a remote computer 6n. The computer 6a software may support up to typically 12 CSU's 2a. It is therefore conceivable that the NAC 3a may be constructed with a single computer 6a and multiple CSU's 2a.

The Subscriber Access Facilities 12 are operated by financial institutions to monitor that part of the traffic for which the institution has responsibility and authority, that is a limited network management capability.

The Network Management Systems 14 control the operation of and provide facilities to aid in the management of the network 8. System 14 provides directory service by keeping information on the characteristics and addresses of the NAC 3a through 3n configurations, and the fall back address.

Figure 2:
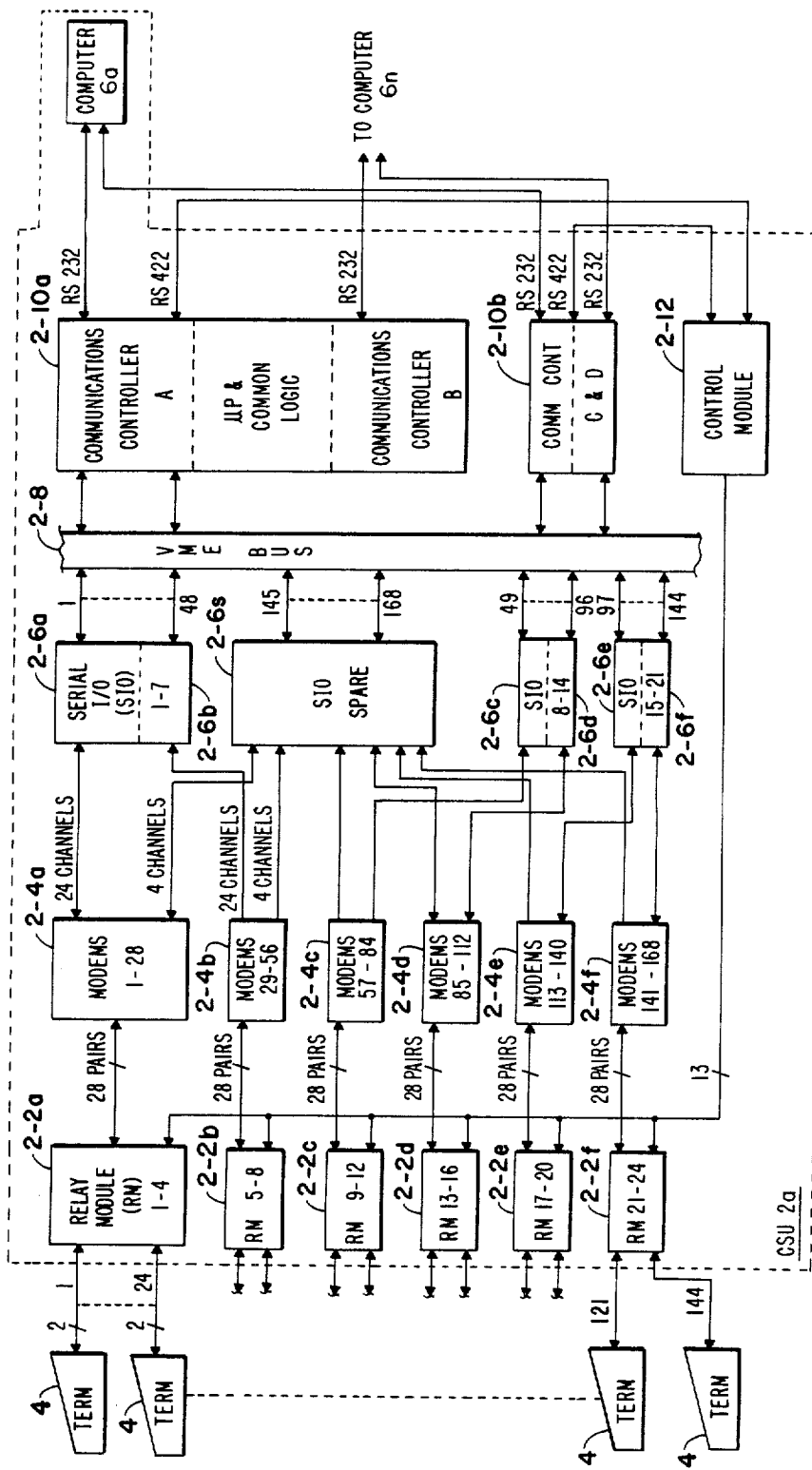
FIG. 2 shows a block diagram of the Network Access Controller.

FIG. 2 shows a block diagram of the CSU 2a. The 144 communication lines and associated terminals 4 are coupled to relay modules 2-2a through relay modules 2-2f respectively. Each relay module 2-2a through 2-2f is made up of four banks of relays. Each bank of relays services up to six communication lines. The twenty-four banks of relays therefore connect to the 144 communication lines. Each relay module 2-2a through 2-2f connects to a MODEM bank 2-4a through 2-4f respectively via 28 pairs of signal lines. Each MODEM bank 2-4a through 2-4f includes twenty-eight MODEMS, twenty-four MODEMS connected to the twenty-four communication lines and four MODEMS as spares.

Each MODEM module 2-4a through 2-4f is connected to its respective half of a serial I/O (SIO) 2-6a through 2-6f by 24 sets of channel signals, one set of signals from each MODEM. The four spare MODEM's from each MODEM module 2-4a through 2-4f are connected to spare SIO 2-6 for a total of 24 spare channels. Switching a spare MODEM into the system also switches in its spare SIO.

Each half SIO 2-6a through 2-6f converts the information on 24 channels received from the respective MODEM modules 2-4a through 2-4f to a parallel stream of characters which is placed on a VMEbus®️ 2-8. The 16 signals on each full duplex channel includes a transmitted data signal and a received data signal, each data signal carrying a stream of data bits. The remaining signals are the normal handshaking signals of the CCITT V.24 interface.

Each pair of SIO's 2-6a and 2-6b, 2-6c and 2-6d and 2-6e and 2-6f provides fifty-six fully programmable, full duplex multi-protocol serial data channels of which only forty-eight are used.

Each MODEM module 2-4a through 2-4f in addition to providing 24 channels to their respective SIO's 2-6a through 2-6f, also provides four spare channels to a spare SIO 2-6s for a total of 24 channels. The SIO 2-6s in turn connects to the twenty-four channels to the VMEbus 2-8.

Also connected to the VMEbus 2-8 are duplicate network processors 2-10a and 2-10b. Network processor 2-10a includes a communication controller A, a communication controller B and a microprocessor and common logic for control of both communication controllers A and B. Communication controller A is connected to computer 6a and 6n via RS232 communication interfaces. Communication controllers A and B are connected to a control module 2-12 via RS422 communication interfaces. Computer 6a assigns network processor 2-10a or 2-10b as a master. If computer 6a determines that processor 2-10a is defective, then computer 6a will assign processor 2-10b as the master. All data is processed by the master processor.

Control module 2-12 provides signals to switch a terminal 4 from a communication path that is inoperative to a spare communication path by activating a selected relay in a relay module 2-2a through 2-2f. Note that each relay module 2-2a through 2-2f includes four banks of relays. Each bank of relays may switch any one of six terminals 4 to a spare MODEM in MODEM modules 2-4a through 2-4f. Note that each of the MODEM modules includes twenty-eight MODEMS, twenty-four MODEMS for normal operation and four spare MODEMS for back-up operation.

Network processor 2-10b includes communication controller C and communication controller D as well as its microprocessor and common logic. Communication controller C is connected to control module 2-12 via a RS422 interface.

Figure 3:
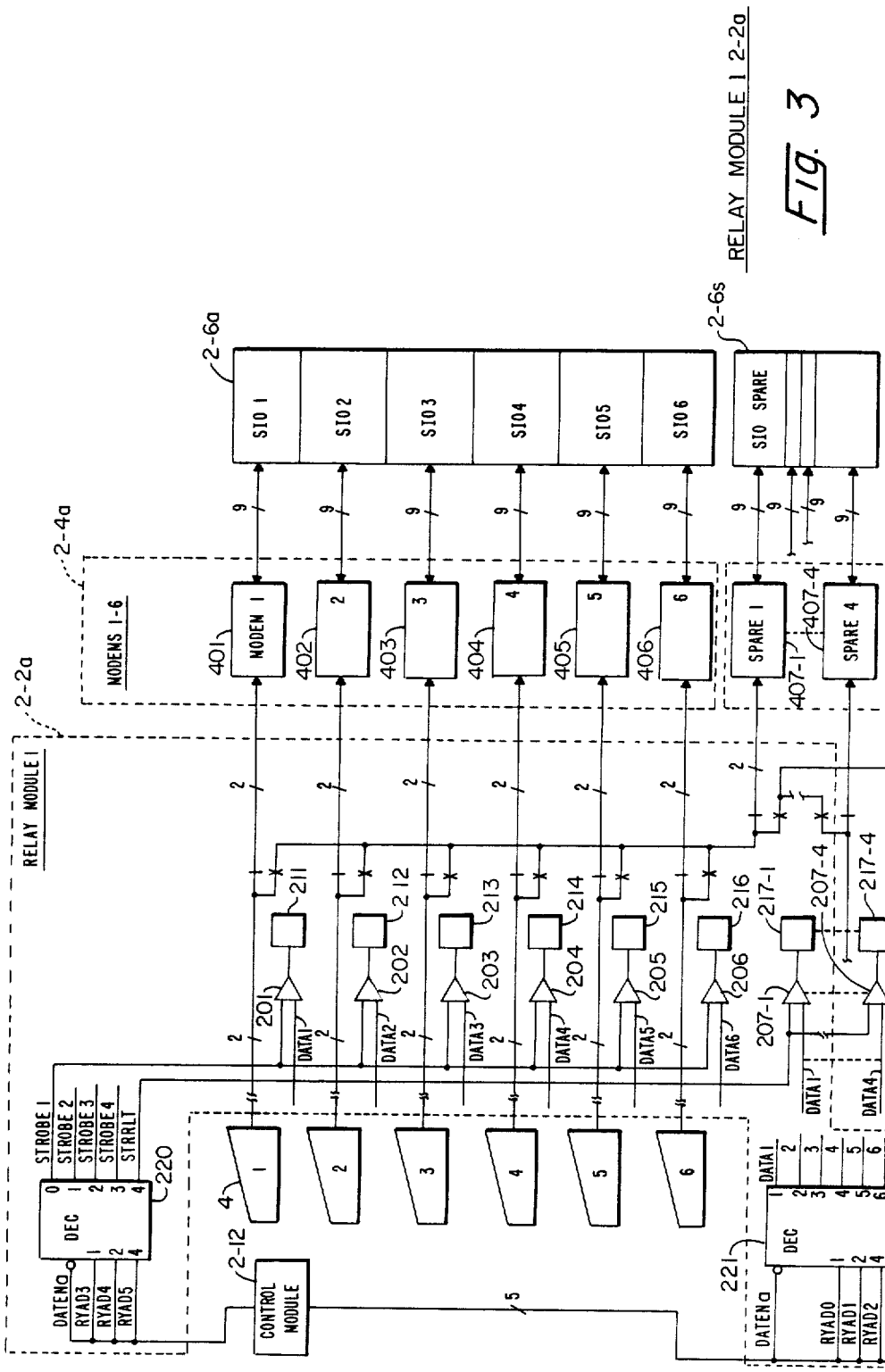
FIG. 3 shows a logic diagram of a Relay Module.

FIG. 3 shows the detailed logic of relay module 1 of relay module 1-4 2-2a. Relay module 1 includes six relays 211 through 216, each activated by their respective drivers 201 through 206 when a failure condition occurs in its communication path. Terminals 1 through 6 are connected to 5 their respective MODEM 1 401 through MODEM 6 406 by a pair of conductors via a pair of normally closed contacts of their respective relays 211 through 216.

When a defective communication path associated with terminals 1 through 6 is detected, control module 2-12 generates a data enable signal DATENa which enables relay module 1-4 2-2a; and generates relay address signals RYAD 3 through RYAD 5 to enable relay module 1, 2, 3 or 4.

Relay module 1 includes a decoder 214 which receives the data enable signal DATENa and relay address signals RYAD 3 through RYAD 5 to generate one of the strobe signals STROBE 1 through 4 or remote line test strobe signal STRRLT.

The STROBE 1 signal from decoder 214 enables drivers 201 through 206. The STROBE 2 signal enables the corresponding drivers (not shown) of relay module 2. The STROBE 3 signal enables the corresponding drivers of relay module 3. The STROBE 4 signal enables the corresponding drivers of relay module 4. The remote line test STRRLT signal enables drivers 207-1 through 207-4.

The defective communication path is switched to a spare MODEM 1 and a spare SIO 2-6s when a decoder 216 receives the data enable signal DATENa and relay address signals RYAD 0 through RYAD 2 from control module 2-12. One of the output signals DATA 1 through DATA 6 is applied to a second input terminal of drivers 201 through 206 respectively to activate one of the relays 201 through 206. Assume that the DATA 3 signal is generated, the Terminal 3 pair of wires is routed through the two normally open contacts of relay 213 to spare MODEM 1 407-1. If at some later time a remote line test is requested, then signal STRRLT from decoder 214 and signal DATA 1 are applied to driver 207-1 to activate relay 217-1. In this case the normally open pair of contacts will transfer a remote line test signal to control modules 2-12a and 2-12b. Note that for the remote line test, signal DATA 1 through DATA 4 activates one of the four relays 217-1 through 217-4 to generate the remote line test signal. Note also that the communication path to the spare modem 1 through 4 is broken by the normally closed pair of contacts of one of the relays 217-1 through 217-4 when one of the relays is activated.

The output channels of MODEMS 401 through 406 are applied to SIO 1 through SIO 6 12-6a and the output channels of spare MODEMS 407-1 through 407-4 are applied to SIO spare 2-6s. This protects against the failure of one SIO section to inactivate a bank of communication lines at a single site.

The logic of relay module 1-4 2-2a is duplicated for relay modules 2-2b through 2-2f. Terminals 25 through 144 are connected to their respective MODEMS 2-4a through 2-4f via relay modules 2-2a through 2-2f.

Figure 4:
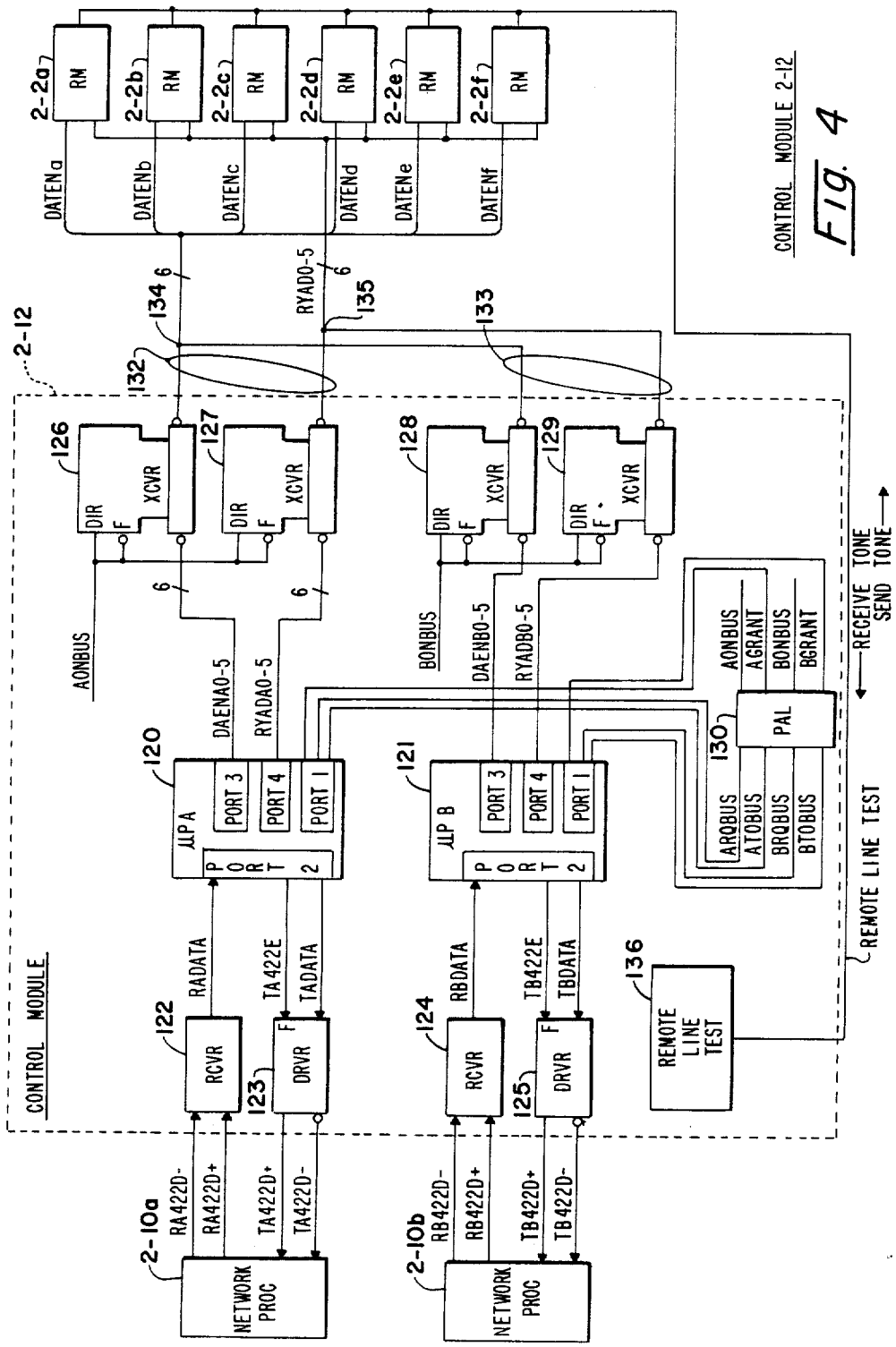
FIG. 4 shows a logic diagram of a Control Module.

FIG. 4 shows a block diagram of control module 2-12 which includes a microprocessor ($\mu$PA) 120 and a microprocessor ($\mu$PB) 121. Microprocessors 120 and 121 are typically Motorola 6801 microprocessors.

RS422 signals RA422D− and RA422D+ are received from network processor 2-10a and applied to receiver (RCVR) 122 which generates receive data signal RADATA. RS422 signals RB422D− and RB444D+ are received from network processor 2-10b and applied to a RCVR 124 to generate receive data signal RBDATA. Signals RADATA and RBDATA are applied to Port 2 of microprocessors 120 and 121 respectively. The $\mu$PA 120 and $\mu$PB 121 each provide a communication path for resiliency (i.e. to prevent one $\mu$PA or $\mu$PB from "streaming" in a failed condition). If the information received indicates a defective communication path, then request bus signals ARQBUS and BRQBUS are applied to a programmable array logic (PAL) 130 from Port 1 of microprocessors 120 and 121 respectively. Also applied to PAL 130 from microprocessors 120 and 121 respectively are connect-to-bus signals ATOBUS and BTOBUS. Signal AGRANT applied to Port 1 indicates that microprocessor 120 is granted access to A bus 132 and signal BGRANT applied to Port 1 indicates that microprocessor 121 is granted access to B bus 133.

Signal AONBUS from PAL 130 enables transceivers 126 and 127 and signal BONBUS enables transceivers 128 and 129.

Following are the Boolean equations of the PAL 130 input and output signals. Note that the (!) preceding a signal name denotes a negated signal. Also note that signals AMASTR and BMASTR indicate if microprocessor 120 or microprocessor 121 is controlling and are internal to the PAL 130.

ADNBUS=!(!AGRANT&!AMASTR&ARQBUS&ATOBUS)

BONBUS=!(!BGRANT&!BMASTR&BRQBUS&BTOBUS)

AGRANT=!(!AMASTR&ARQBUS)

AMASTR=!(ARQBUS&BGRANT)

BGRANT=!(!BMASTR&BRQBUS)
BMASTR=!(!AGRANT&BRQBUS)

.Enable signals DAENA 0-5 from Port 3 of microprocessor are applied to relay modules 2-2a through 2-2f via Transceiver 126 and a function 134 as signals DATENa through DATENf respectively to select the relay module 22a through 22f included in the defective communication channel. Similarly in parallel, signals DAENB 0-5 from Port 3 of microprocessor 121 are applied to a junction 134 via transceiver 128.

Signals RYADA 0-5 and RYADB 0-5 from Port 4 of microprocessors 120 and 121 respectively are applied to an AND junction 135 via transceivers 127 and 129 respectively to generate relay address signals RYAD 0-5. Signals RYAD 0-5 select the relay in the enabled relay module to switch the communication path to the spare MODEM.

Junctions 134 and 135 generate output signals when both input signals are low. Junctions 134 and 135 remain active when either network processors 2-10a or 2-10b are inactivated or a portion of control module 2-12 is inoperative.

RS422 transmit signals TA422D+ and TA422D− are sent back to network processor 2-10a via Port 2 of microprocessor 120, signals TA422E and TADATA and a driver (DRVR) 123. RS422 transmit signals TB422D+ and TB422D− are sent back to network processor 2-10b via Port 2 of microprocessor 121, signals TB422E and TBDATA and a driver 125.

A remote line test 136 sends and receives tone signals which test the line continuity between the Terminals 4 and the relay modules 2-2a through 2-2f. The tone signal path is from remote line test 136, to normally open contact of relays 207-1 through 207-4, to the selected normally open contact of relays 211 through 216, to the Terminal 4. This tests the line that was switched to the spare MODEM.

MODEM 1 through MODEM 6 of FIG. 3 are connected by their respective 16 signal line CCITT V.24 channels to SCC's 601, 602 and 603. MODEMS 8 and 9 are connected by their respective CCITT V.24 channels to SCC 604. Each channel of the V.24 interface includes the full duplex operation of the transmit data and receive data operations. In addition to the synchronization timing, control signals and maintenance signals for the interface.

Figure 5:
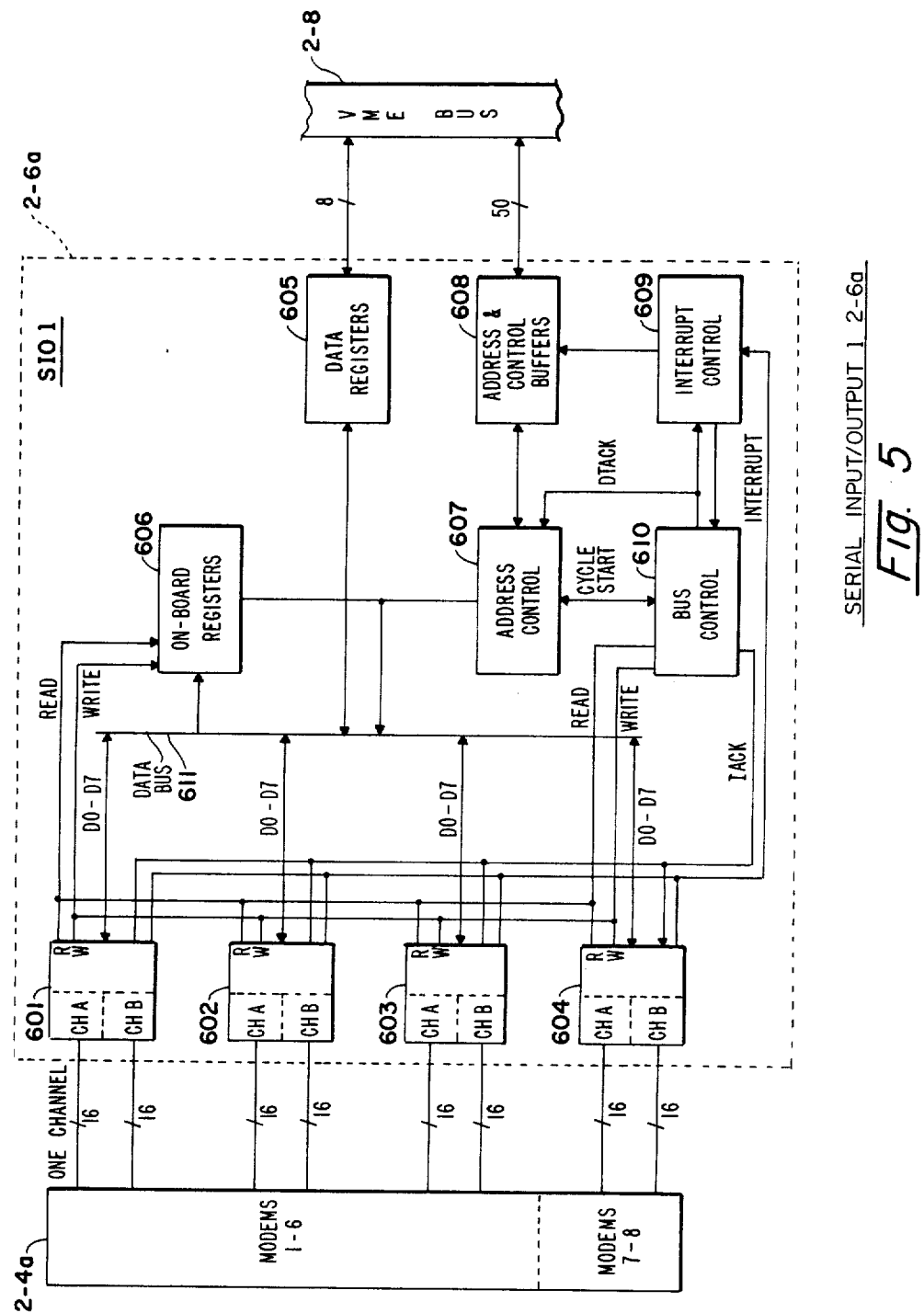
FIG. 5 shows a block diagram of a Serial Input/Output Module.

FIG. 5 shows a block diagram of SIO 1 2-6a. As shown in FIG. 2, SIO 2-6a and SIO 6b include seven SIO's; each of the seven is a duplicate of SIO 1. Similarly SIO 2-6c and 2-6d, and 2-6e and 2-6f are duplicates of SIO 2-6a and 2-6b. They are shown as two halves since 24 channels require three and one/half SIO's.

SIO 1 includes four Serial Communications Controllers (SCC) 601, 602, 603 and 604. Each SCC services two channels designated CH A and CH B. The SCC's are typically Z8530 controllers.

The SCC's 601 through 604 communicate with the VMEbus 2-8 by bidirectional data signals D0 through D7 and data register 605.

Address and control information are transferred to and received from the VMEbus 2-8 through address and control buffers 608. Address information is received by the data bus 611 via address control 607. The data bus 611 carries register address information to the SCC's as well as data or control information to and from the VMEbus 2-8.

The SCC's generate an interrupt signal to interrupt control 609 which generates an interrupt request via the interrupt request line to the VMEbus 2-8. When the VMEbus 2-6 acknowledges the interrupt, the interrupt control 609 signals the Bus Control 610 which, in turn, responds with an interrupt acknowledge cycle, placing an interrupt vector on the VMEbus 2-8 and asserting the data transfer acknowledge signal DTACK. The interrupt cycle is released by the deassertion of the DTACK signal.

A number of on-board registers 606 control the SIO operation. They include a data rate selector register, a command/status read/write register and a loopback-/maintenance register (not shown).

Figure 6:
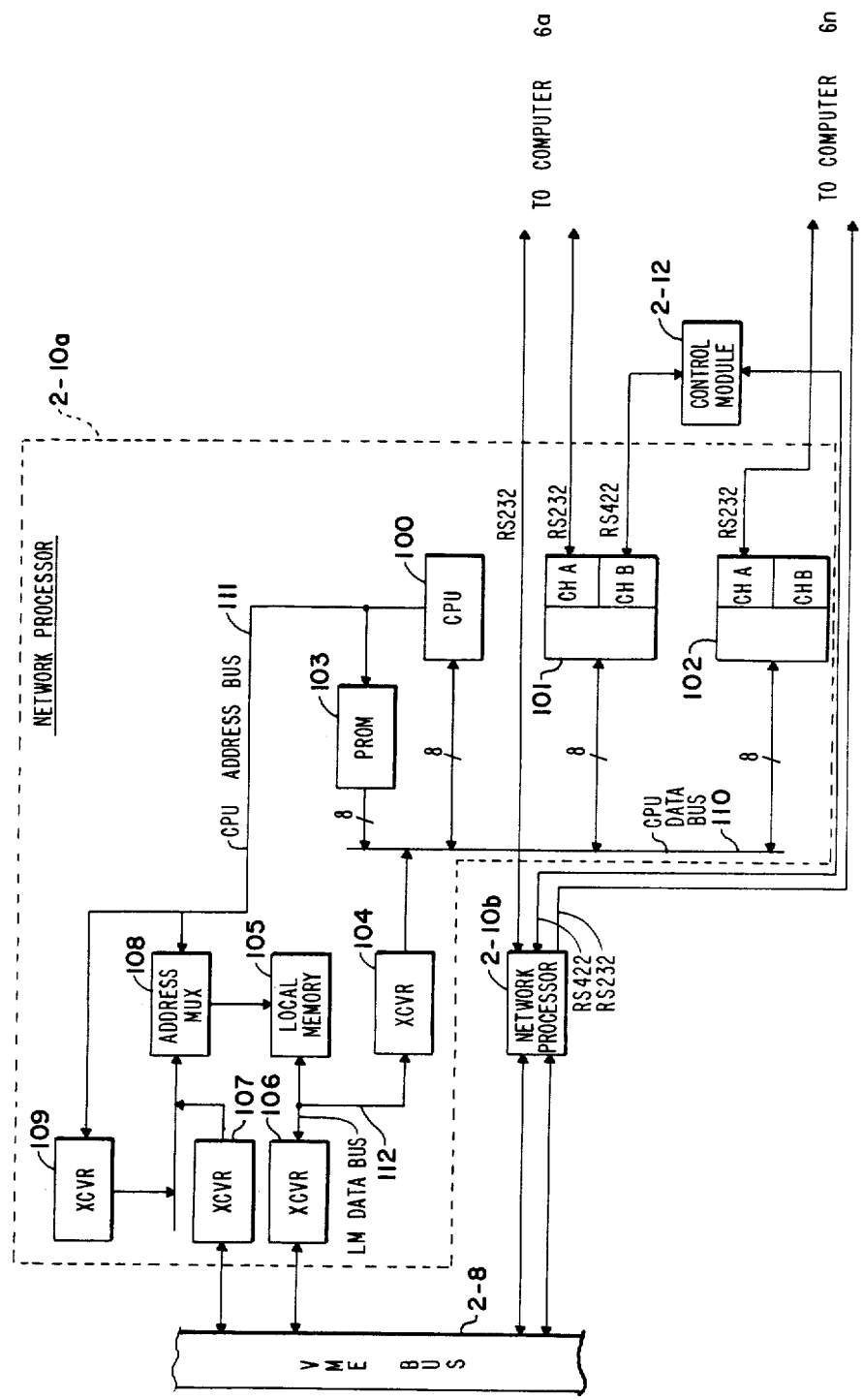
FIG. 6 shows a block diagram of a Network Processor.

FIG. 6 shows a block diagram of the network processor 2-10a which transfers information between the VMEbus 2-8 and the computer 6a. Network processor 2-10b also transfers information between the VMEbus 2-8 and the computer 6a.

Data from the VMEbus 2-8 appears on the CPU data bus 110 via a transceiver 106 and a transceiver 104. The sixteen bit data is received by a CPU 100 and conditions the SCC's 101 and 102 to receive the data for transfer to computer 6a over a channel A RS232 interface or transfer the data to the control module 2-12 over the RS422 interface from channel B of SCC 101 and 102.

The CPU 100 bootstrap and quality logic tests are stored in PROM 103. The data received from the VMEbus 2-8 may be stored in a local memory 105 via transceiver 106 at an address specified by the VMEbus 2-8 address signals which are applied to local memory 105 via a transceiver 107 and an address MUX 108. The data is read out of local memory 105 by CPU 100 generating an address over CPU address bus 111 and address MUX 108. The address may also be placed on the VMEbus 2-8 via a transceiver 109 and transceiver 107. The application software is stored in the local memory 105.

Data is received from computer 6 over the RS232 channel, and channel B of the SCC 101. It is transferred over CPU data bus 110 to the VMEbus 2-8 via transceiver 104 and transceiver 106.

Computer 6a is responsible for the overall control of the NAC 3a. At start-up, a microcode in PROM 103 supports self test operation and enables itself to be booted from computer 6a. By loading programs into local memory 105, computer 6a directs all CSU 2a actions. If the CSU 2a loses contact with computer 6a, it will establish contact with computer 6n. In addition computer 6a controls the polling of communication lines provides configuration and control commands, such as resolving faults detected in the CSU 2a by switching spare equipment into active service to replace failed or failing equipment.

The operation of network processor 2-10a is described. However network processor 2-10b is a duplicate of network processor 2-10a. Both network processors 2-10a and 2-10b share the load or any portions of the load. For example, network processor 2-10a may communicate with SIO 2-6a and 2-6b, and network processor 2-10b may communicate with SIO 2-6c, 2-6d, 2-6e and 2-6f. Either network processor 2-10a or 2-10b may communicate with SIO 2-6a through 2-6f if one is out of service.

In normal operation the primary role of the CPU 6a is to relay messages between the Terminals 4 and the Financial Institutions 10.

Figure 7:
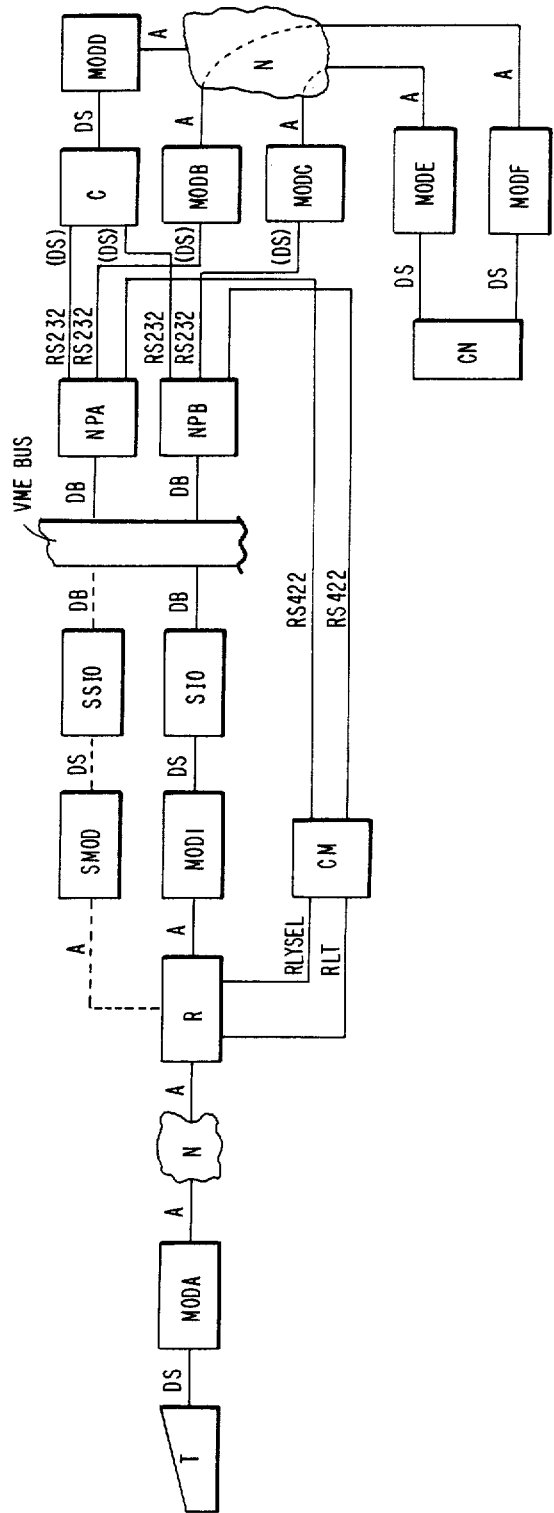
FIG. 7 shows the data flow through the elements of the overall system.

FIG. 7 shows a diagram of the resiliency paths of EFTPOS 1. The normal path is for terminal T to send a serial digital message to MODEM A which converts the serial digital signals DS to serial analog signals A which enters network N. The serial analog signals exit network N and pass through relay network R to MODEM 1. MODEM 1 converts the serial analog signals to serial digital signals DS and sends them to the SIO. The SIO converts the serial digital signals DS to data bytes DB which it places on the VMEbus.

Network processor A (NPA) and network processor B (NPB) process the data bytes DB from the VMEbus and converts the data bytes to serial digital signals DS which are received by computer C. Computer C sends the serial digital signals DS to MODEM D which converts them to serial analog signals A for transfer to communications network N. A response message from network N travels in a reverse direction through the above elements.

If computer C finds network processor A to be inoperative, then computer C makes network processor B handle the whole load. If network processor A or network processor B find that computer C is inoperative, then it communicates with back-up computer CN via MODEM B, communications network N and MODEM F.

If NPB is the master and finds computer C inoperative, then it switches to back-up computer CN via MODEM C, communications network N and MODEM E.

If computer C find the communication link inoperative, it causes the master NPA or NPB to send serial digital signals to control module CM which in turn generates relay select signals RLYSEL which are applied to relay network R. This switches spare MODEM S and spare serial input/output S SIO to replace MODEM 1 and SIO. Note that all SIO's apply the data bytes DB to the VMEbus. NPA and NPB are both connected to the VMEbus and receive the data bytes from their respective SIO's.

If the communications link is still inoperative, then the NPA or NPB will send a remote line test request to CM. CM will send relay select signals RLYSEL to connect the communication path from the relay network R to the terminal T to a tone box in the relay module, the tone box will send out a tone to the terminal and wait to receive the tone back, thereby verifying the communication link.

Figure 8:
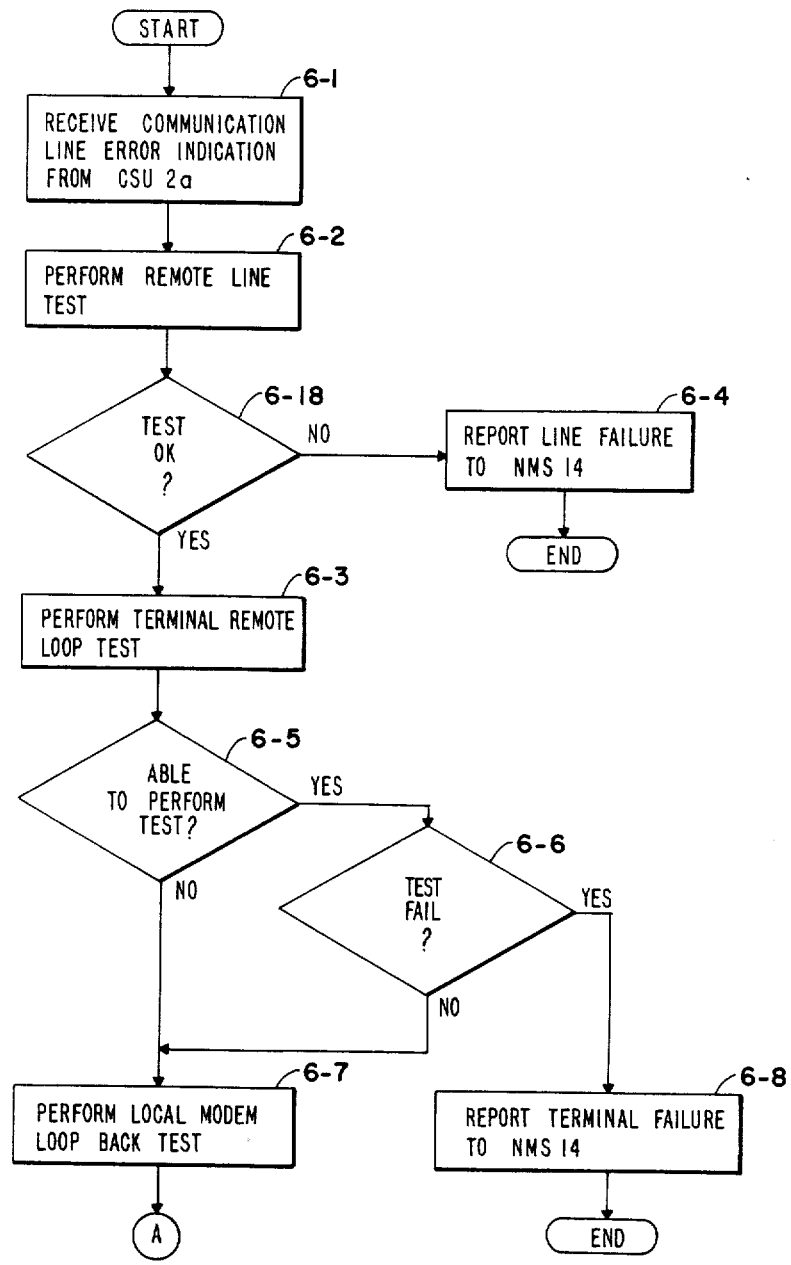
FIG. 8 is a block diagram of the steps taken by computer 6a to test the CSU 2a MODEM/SIO and the terminals communication connection.
Figure 8:
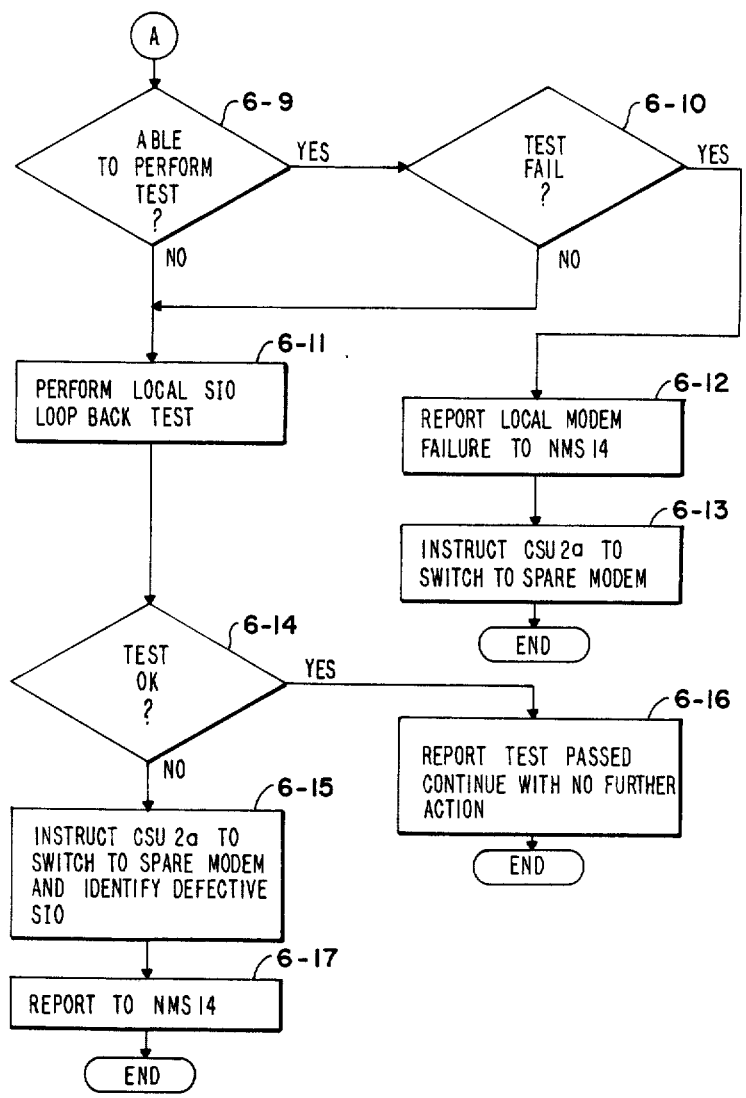

FIG. 8 is a block diagram of steps taken by computer 6a to test if there is a failure in the Terminal path to the CSU 2 or in the MODEM or SIO. This results in the CSU 2a switching to a spare MODEM/SIO and reporting the Terminal, MODEM or SIO failure to the Network Management Systems 14.

Block 6-1 receives a communication line indication from the CSU 2a of a problem. Typical signals are a timeout signal and no data set ready (DSR) signal indicating the loss of a MODEM.

Block 6-2 instructs the CSU 2a to perform the remote line test by activating the relay in the line in which the malfunction occurred.

Decision block 6-18 branches to block 6-4 if the test showed a defective communication line. Block 6-14 sends a message into the network to report the failure to the Network Management Systems 14.

If the test proves satisfactory, then block 6-3 tests remote terminal 4 Modem (MODA, FIG. 7). To accomplish this the relay of relay modules 2-2a through 2-2f must be deactivated. All further test initiations require no relay switching.

Decision block 6-5 determines if the test is able to be performed by receiving a response from the CSU 2a.

If the test can be performed, decision block 6-6 branches to block 6-8 if the test to MODA failed. Block 6-8 reports the failure of the terminal 4 to Network Management Systems 14. If the test is successful, then block 6-7 tells the CSU 2a to do a loopback test between the MODEM and SIO in question.

Decision block 6-9 determines if the MODEM/SIO is able to perform the test. If so, then decision block 6-10 determines if the test failed. If the test did fail, then block 6-12 reports the local MODEM failure to the Network Management Systems 14.

Block 6-13 then instructs the CSU 2a to switch to the spare MODEM/SIO.

If decision block 6-9 indicates that the CSU 2a was unable to perform the test, or decision block 6-10 indicates that the test failed, then block 6-11 performs a local SIO loopback test.

Decision block 6-14 determines if the test is successful. If the test is not successful, then in block 6-15 the CSU 2a is instructed to switch to the spare MODEM and provide an indication of the defective SIO.

Block 6-17 reports the defective SIO to the Network Management Systems 14.

If decision block 6-14 indicates that the test is successful, then block 6-16 reports to the Network Management Systems 14 that the test is successful and the system continues with no further test action.

Figure 9:
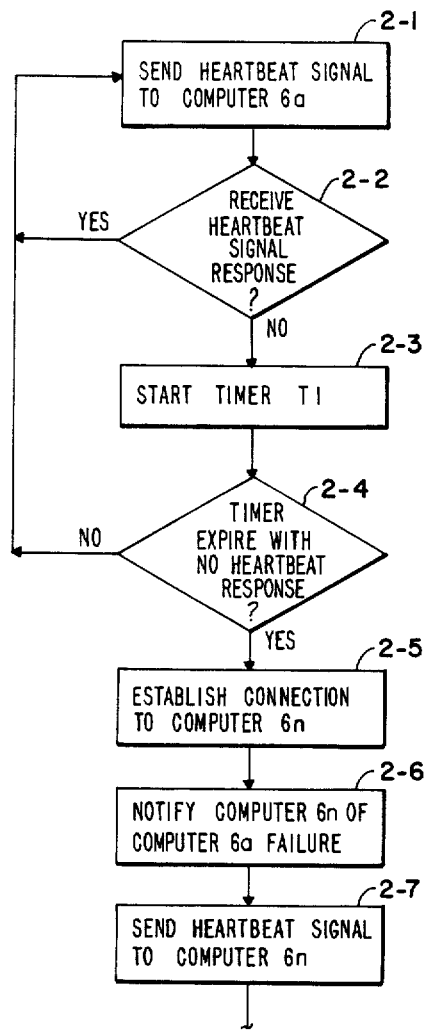
FIG. 9 is a block diagram of the steps taken by the CSU 2a to assure that the computer 6a is operative.

FIG. 9 is a block diagram of steps taken by the CSU 2a to assure that computer 6a is operative, and if not, to switch to computer 6n.

Block 2-1 sends a "heart beat" signal to computer 6a.

Decision block 2-2 receives a response that computer 6a received the "heart beat" signal. If the response is not received, then block 2-3 starts a 500 microsecond timer T1. The timer T1 is reset if the "heart beat" signal is received before 500 microseconds has elapsed.

Decision block 2-4 tests if the 500 milliseconds elapsed with no "heart beat" signal. If there was no timeout then block 2-1 sends another "heart beat" signal.

If decision block 2-4 indicated that timer T1 timed out, then block 2-5 establishes a connection to computer 6n.

Block 2-6 notifies computer 6n to inform Network Management Systems 14 that computer 6a is inoperative.

Block 2-7 sends the "heart beat" signal to computer 6n and continues the testing of computer 6n.

Figure 10:
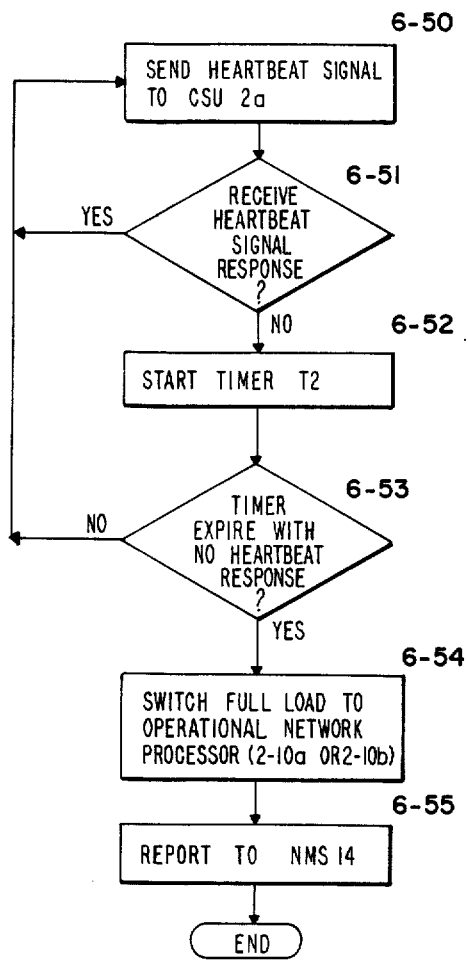
FIG. 10 is a block diagram of the steps taken by the computer 6a to test if the CSU 2a is operative.

FIG. 10 is a block diagram of the steps taken by computer 6a to test if the CSU 2a is operative.

Block 6-50 sends the "heart beat" signal to the CSU 2a.

Decision block 6-51 tests for the response from CSU 2a to the "heart beat" signal. If the response is received, then block 6-50 again sends the "heart beat" signal. If the response is not received, then block 6-52 starts 100 millisecond timer T2.

Decision block 6-53 tests if timer T2 times out. If it does timeout, then block 6-54 tells the other network processor in the CSU 2a to take over the duties of the failed network processor.

Block 6-55 notifies the Network Management Systems 14 of the change in configuration.

Note that the duration of timer 2 is much less than the duration of timer 1. The reason for this is to handle the case in which the communication path between a CSU 2a network processor (2-10a or 2-10b) fails. This enables the other network processor in the CSU 2a to take over. If there were not the big difference in timeouts, the CSU 2a may switch to computer 6n when in reality the second network processor in the CSU 2a should take over the entire load. This avoid the problem of the CSU 2a being supported by computer 6a and 6n concurrently.

While the invention has been shown and described with reference to the preferred embodiment thereof, it will be understood by those skilled in the art that the above and other changes in form and detail may be made therein without departing from the spirit and scope of the invention.

What is claimed is:

1. A resilient data communications system for transferring information between a subscriber and a communication network, the data communications system comprising:
   a. terminal means;
   b. relay switching means;
   c. a plurality of conversion means;
   d. a bus means;
   e. a plurality of network processor means;
   f. a computer means; and
   g. control module means, wherein in the data communications system:
   a. the terminal means is connected to the relay switching means;
   b. the relay switching means is connected between the terminal means and the plurality of conversion means;
   c. the plurality of conversion means is connected between the relay switching means and the bus means;
   d. the bus means is connected between the plurality of conversion means and the plurality of network processor means;
   e. the plurality of network processor means is connected between the bus means and the computer means, and there is also a connection from the plurality of network processor means to said communication network;
   f. the computer means is connected between the plurality of network processor means and said communication network; and
   g. the control module means is connected between the plurality of network processor means and a control input of the relay switching means and wherein further in the data communications system:
   a. the terminal means is for passing serial digital data bidirectionally between the relay switching means and a subscriber operating a keyboard and viewing a display;
   b. the relay switching means is adapted to select one certain of the plurality of conversion means in response to a signal at its input from the control module means and to pass serial digital data bidirectionally between the terminal means and the one certain of the conversion means;
   c. the conversion means is adapted to convert data bidirectionally between serial digital data and parallel data bytes, to transmit parallel data bytes bidirectionally to or from the bus means, and to transmit serial digital data bidirectionally to or from the relay switching means;
   d. the plurality of network processor means is adapted to convert data bidirectionally between parallel data bytes and serial digital data, to transmit parallel data bytes bidirectionally to or from the bus means, and responsive to the computer means to transmit serial digital data bidirectionally to or from the computer means; and
   e. the computer means is adapted to transmit serial data bidirectionally from or to the communications network responsive to control signals thereon, and to send control signals to the plurality of network processor means, and wherein further the plurality of network processor means is adapted to detect, responsive to signals from the computer means, that the computer means has ceased to function and to thereupon request, via its connection to said communications network, control signals from the computer means of a different resilient communications systems, and the computer means is adapted to receive via said communications network requests for control signals from the network processor means of a different communications system and to provide such control signals via said communications network, whereby if at least two resilient communications systems are connected to a communications network, functionality of both may be maintained despite failure of the computer means of one of them.

2. The resilient data communications system recited in claim 1, wherein further:

the computer means is adapted to detect, by the state of the data from the plurality of network processor means, that one of the network processor means has failed, and to signal the remaining ones of the plurality of network processor means to transmit the data that would have been transmitted by the failed one of the network processor means.

3. The resilient data communications system recited in claim 1, wherein further:

any of the plurality of network processor means is adapted to detect, by the state of data from the bus means, that either the terminal means or the certain one of the plurality of conversion means has failed and to signal the control module means to signal the relay switching means to select a different certain one of the plurality of conversion means.

4. The resilient data communications system recited in claim 3, wherein further:

the relay switching means has provision to send a first test tone to the terminal means;

the terminal means is adapted to respond to the first test tone with a second test tone; and if after having selected a different certain one of the plurality of conversion means the network processor means still detects that either the terminal means or the certain one of the plurality of conversion means has failed, the network processor means signals the control module to signal the relay switching means to send the first test tone to the terminal means and to await receipt of the second test tone, whereby the operational status of the terminal means may be determined.

* * * * *